Sept. 9, 1969 HANS-JÜRGEN MAUTE 3,466,510

INTEGRATED GRAETZ RECTIFIER CIRCUIT

Filed Jan. 5, 1968 2 Sheets-Sheet 1

Inventor:
Hans-Jürgen Maute

BY Spencer & Kaye
Attorneys

INTEGRATED GRAETZ RECTIFIER CIRCUIT

Filed Jan. 5, 1968 2 Sheets-Sheet 2

Inventor:
Hans-Jürgen Maute

BY Spencer & Kaye
Attorneys

United States Patent Office 3,466,510
Patented Sept. 9, 1969

3,466,510

INTEGRATED GRAETZ RECTIFIER CIRCUIT

Hans-Jürgen Maute, Heilbronn-Bockingen, Germany, assignor to Telefunken Patentnerwertungsgesellschaft m.b.H., Ulm (Danube), Germany Filed Jan. 5, 1968, Ser. No. 695,991
Claims priority, application Germany, Jan. 7, 1967, T 32,939
Int. Cl. H01l 3/00, 5/00, 11/00
U.S. Cl. 317—234 18 Claims

ABSTRACT OF THE DISCLOSURE

An integrated Graetz rectifier circuit arrangement suitable for use as a full wave rectifier or the like. The circuit arrangement includes a semiconductor body of a first conductivity type; two semiconductive first zones of a second conductivity type disposed, one electrically separated from the other, on the semiconductor body; two semiconductive zones of the first conductivity type each disposed on a respective one of the first zones; and two semiconductive third zones of the second conductivity type each disposed on a respective one of the first zones. Each of the third semiconductive zones is provided with a separate electrical terminal and each pair of adjoining first and second semiconductive zones is provided with a common electrical terminal.

BACKGROUND OF THE INVENTION

The present invention relates to a solid-state integrated switching circuit; more particularly, to an integrated Graetz rectifier circuit arrangement.

The Graetz rectifier circuit, as is well known in the art, consists of four diodes connected in a bridge circuit. The Graetz rectifier is employed, most generally, as a full wave rectifier. Already known in the art is an integrated Graetz rectifier arrangement which includes a regular hexagonal hollow semiconductor body having a pn-junction running parallel to its surface. This arrangement is divided into the individual diodes by means of alternate internal and external cuts or notches made in the corners of the semiconductor which reach down to the pn-junction. The individual zones of the six-cornered polygon are then provided with the necessary contacts to produce the Graetz rectifier circuit.

Although this prior art arrangement serves as a satisfactory electrical circuit, its hexagonal hollow semiconductor body can be manufactured only with difficulty. The notches which must be added to the already complicated polygonal structure also create problems with the stability of the semiconductor body and make its manufacture even more difficult. It may also be appreciated that the contacts to the individual zones in such a three-dimensional arrangement can not be made economically with mass production techniques.

Still another disadvantage of this prior art arrangement is that each rectifier must be individually produced. It is not possible, as it is with planar-type semiconductors, to make a great number of identical elements from a single sheet of semiconductor material.

SUMMARY OF THE INVENTION

An object of the present invention, therefore, is to design and integrated Graetz rectifier circuit which may be easily and economically manufactured and which may, if necessary, be produced in large quantities.

This, as well as other objects which will become apparent in the discussion that follows, are achieved, according to the present invention, by means of an arrangement including a semiconductor body of a first conductivity type; two semiconductor first zones of a second conductivity type disposed, electrically separated from each other, on the semiconductor body; two semiconductive second zones of the first conductivity type each disposed on a respective one of the first zones; two semiconductive third zones of the second conductivity type each disposed on a respective one of the second zone; two electric terminals each connected to a respective one of the third zones and two electric terminals each connected to both one of the first zones and the one of the second zones disposed thereon.

This type of semiconductor arrangement can, for example, be constructed with the two first zones embedded in the surface of the semiconductor body and with each of the second zones together with the one of the third zones which is disposed on the particular second bone forming mesa-shaped bodies mounted on the two first zones, respectively. In this case, each of the second electrical terminals includes a metal layer disposed between and contacting both ones of the adjoining first and second zones.

The integrated Graetz rectifier circuit arrangement according to the present invention can, on the other hand, be constructed so that the two first zones are embedded in the surface of the semiconductor body, each one of the two second zones is embedded in the surface of a respective one of the first zones and each one of the two third zones is embedded in the surface of a respective one of the second zones. In this case, each of the two second terminals includes an ohmic contact arranged to contact one of the first zones and the one of the second zones embedded therein.

A further object of the present invention is to produce a Graetz rectifier circuit arrangement which is capable of withstanding a high inverse voltage in spite of its integrated construction. The danger of a voltage breakdown at relatively low inverse voltages is especially great when the pn-junction to which the inverse voltages apply is not entirely planar, but exhibits portions which are curved. Such is the case, for example, when the semiconductor arrangement is of a planar-type construction with semiconductive zones embedded in a planar surface of a semiconductor body, so that the pn-junctions must terminate at the surface of the semiconductor body. An electric field of high intensity forms already at low inverse voltages in the charge carrier free space charge zone around the curved portions of the pn-junctions and can cause a voltage breakdown at already a relatively low inverse voltage.

A voltage breakdown at the curved pn-junctions to which an inverse voltage is applied is prevented, according to the present invention, by so-called isolating zones. These isolating zones which surround the pn-junctions in question have a conductivity type which is always opposite to that of its surroundings. These isolating zones are arranged a prescribed distance away from the endangered pn-junction, especially around the portion of the pn-junction at which high field intensities appear at low inverse voltages, so that the charge carrier free space charge zone, which extends outward around the pn-junction on application of an inverse voltage that is safely below the voltage which would cause breakdown, abuts the isolating zone.

When the space charge zones does abut the isolating zone, the latter receives a part of the inverse potential. Charge carriers could then be removed from the isolating zone, which carriers, however, as a result of the prevailing doping and potential conditions, could not be replenished from the region surrounding the isolating zone.

When the inverse voltage at the pn-junction in question is further increased, another space charge zone develops around the isolating zone. If this isolating zone is in turn surrounded by another isolating zone, this second zone will likewise receive a potential when the inverse voltage on the isolated pn-junction is increased so far that the space charge zone abuts against the second zone. These isolating zones thus limit the potential difference and, therewith, the electrical field intensity between the curved portions of the isolated pn-junction and the isolating zones. The potential difference is kept within a maximum value which precludes the possibility of a voltage breakdown.

In practice the isolating zones are not themselves provided with electrical terminals and operate without an externally applied potential in the Graetz circuit according to the present invention.

Description of the preferred embodiments

Figure 1:
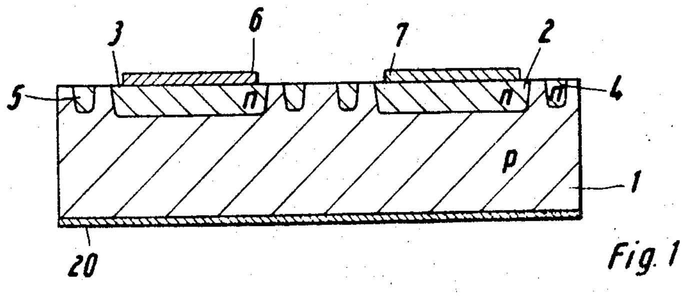
FIGURE 1 is a cross-sectional elevational view of the integrated Graetz circuit according to a first embodiment of the present invention in a first stage of manufacture.

Referring now to the drawings there is shown in cross section in FIGURE 1 the initial phase of manufacture of embodiment of the integrated Graetz circuit arrangement according to the present invention. This arrangement has a starting semiconductor body 1 of a p-conductivity type which, for example, may be part of a large plate of semiconductor material from which a large number of identical Graetz circuits are simultaneously manufactured. For the sake of simplicity this as well as the other figures of the drawings show only a single semiconductor element as it would appear after the semiconductor plate was divided into the individual elements. All the stages of maufacture which are illustrated in FIGURES 1–3, however, may also be applied to the whole semiconductor plate and can lead to the manufacture of a number of identical Graetz circuits lying next to each other side by side on the semiconductcor plate.

In the p-conductive starting semiconductor body 1, which may, for instance, consist of silicon, are diffused two semiconductor zones, 2 and 3. These zones are made with an n-type conductivity and are arranged on a surface of the semiconductor body so as to be electrically separated from each other. They may be produced with the aid of the well-known masking and etching techniques. Two isolating zones 4 and 5 are also introduced into the semiconductor body together with these zones 2 and 3 so that such isolating zone surrounds one of the zones 2 or 3. These isolating zones are also made with an n-conductivity type; that is, the same as are zones 2 and 3. The depths of these isolating zones in the semiconductor body correspond to those of the zones 2 and 3 so that they can be diffused into the semiconductor body together with the zones 2 and 3. The protective zones are shaped either as a circular ring or a rectangular frame so as to correspond to the shapes of the zones 2 and 3.

Metal contacts 6 and 7 are nest-mounted, one on each of the zones 2 and 3. These contacts may, for example, be vaporized or evaporated onto the zones 2 and 3 with the aid of a metal mask. These metal contacts must be able to form an ohmic contact with n-conductive as well as with p-conductive semiconductor material. A layer of molybdenum or a lamination of titanium-silver-titanium is suitable, for example, for this purpose. A metallic layer 20 is likewise added to the surface of the p-conductive semiconductor body 1 which lies opposite the metal contacts 6 and 7. This metallic layer which must also provide an ohmic contact may be made, for instance, of gold or platinum.

Figure 2:
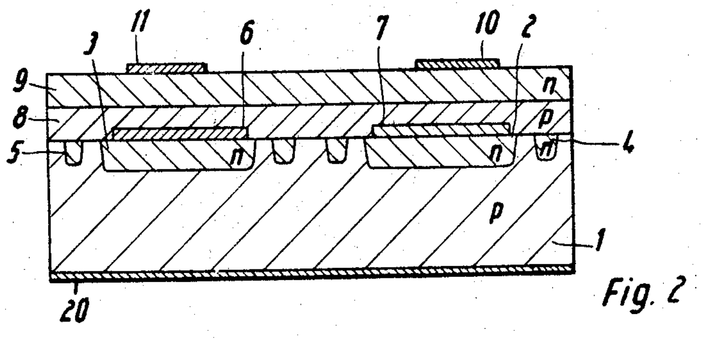
FIGURE 2 is a cross-sectional elevational view of the integrated Graetz circuit according to the first embodiment of the present invention, in a second stage of manufacture.
Figure 3:
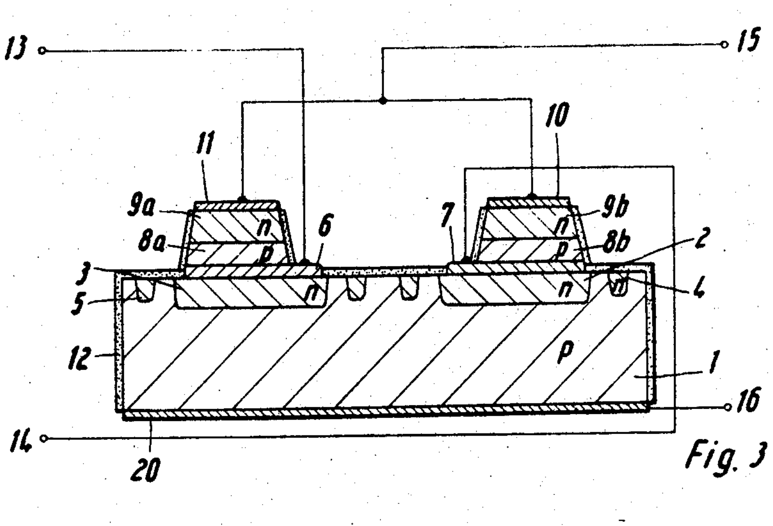
FIGURE 3 is a cross-sectional elevational view of the integrated Graetz circuit according to the first embodiment of the present invention, in the final stage of manufacture.

In the next stage of manufacture, illustrated in FIGURE 2, the surface of the semiconductor body that is provided with the contacts 6 and 7 is covered with a semiconductive layer extending over the entire surface; this layer consists of two successive zones 8 and 9 of opposite conductivity type. The semiconductor zone 8 which borders the metal contacts 6 and 7 is doped to have p-conductivity whereas the subsequent zone 9 is doped to have n-conductivity. The semiconductive layer comprising zones 8 and 9 may, for example, be formed epitaxially whereby the respective doping media which correspond to the zones are added to a diffusing stream of gas.

On top of the semiconductor zone 9 are mounted two metal contacts 10 and 11 which provide an ohmic contact with the n-conductive semiconductor zone. These contacts may be formed, for example, from vaporized aluminum. The metal contacts 10 and 11 are arranged directly above the contacts 6 and 7; however, their surfaces are smaller than the surfaces of the contacts 6 and 7.

The semiconductor arrangement illustrated in FIGURE 2 is then treated with one of the known selective etching media which attach the semiconductor material but which are inactive with respect to the metal contacts 6, 7, 10 and 11. The result of this treatment is illustrated in FIGURE 3. There is shown, in cross-section, a semiconductor arrangement having two mesa-shaped semiconductor bodies each with two zones **8*a*, 9*a* and 8*b*, 9*b* of opposite conductivity types, respectively. The semiconductor bodies are arranged on top of the metal contacts 6 and 7**.

As the semiconductor arrangement of FIGURE 2 is etched, the metal contacts serve as masks preventing the covered semiconductor material from being etched away. The etching process may thus be terminated when the semiconductor material of the layers 8 and 9 has been etched down to the surface of the starting semiconductor body 1. After the etching process the semiconductor arrangement is preferably thermally oxidized so that all the exposed areas of the semiconductor will be covered by an insulating and protective oxide layer 12.

The semiconductor arrangement, as shown in FIGURE 3. thus consists of two pnpn series of zones, a first series formed by the zones 1, 3, **8*a* and 9*a* and the second by the zones 1, 2, 8*b* and 9*b*. The zone 1 which is the foundation semiconductor body and is common to both series of zones is provided with a metal contact 20 which is connected to an electrical terminal 16. The two other outside n-conductive zones 9*a* and 9*b* of the two series of zones are provided with the contacts 10 and 11. These contacts are electrically connected together and to a common electrical terminal 15. Each of the central zones 3 and 8*a*, as well as 2 and 8*b* of the series of zones are provided with a common contact 6 and 7, respectively. These two contacts connect together the oppositely conductive internal zones and are joined to the electrical terminals 13 and 14, respectively. The two terminals 13 and 14 of this Graetz circuit form the alternating current input terminals, whereas the terminals 15 and 16** form the output terminals. Direct current will thus appear at the output terminals if alternating current power is supplied to the input terminals.

All the zones of the semiconductor arrangement preferably possess the same doping so that all of the diodes formed in the Graetz circuit will exhibit the same current-voltage characteristic. The two pn-junctions in the mesa-shaped part of the semiconductor arrangement can withstand high inverse voltages because these junctions are planar. The two pn-junctions formed by diffusion in the starting semiconductor body 1, are likewise protected against voltage breakdowns by the isolating zones 4 and 5. As a result the whole semiconductor arrangement may be driven with high voltages in the backward direction without a breakdown across the respective pn-junctions.

Figure 4:
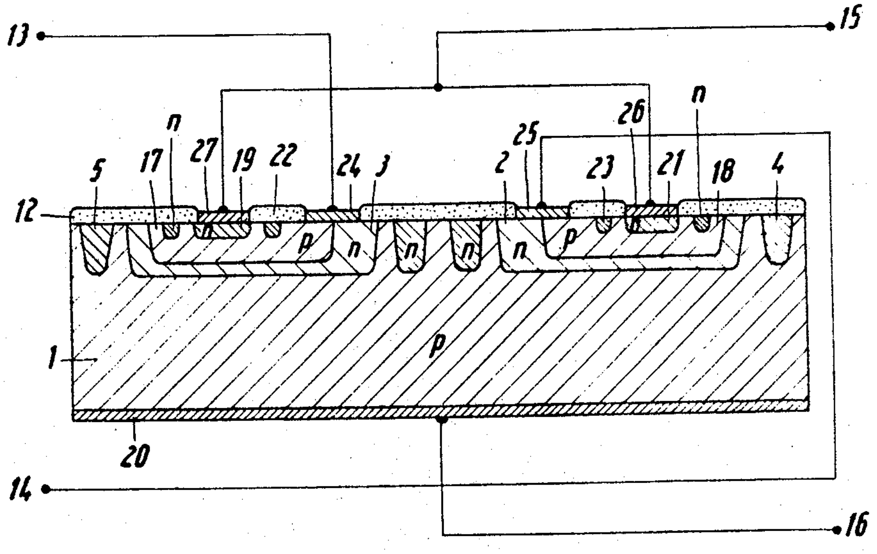
FIGURE 4 is a cross-sectional elevational view of the integrated Graetz circuit according to a second, planar embodiment of the present invention.

FIGURE 4, illustrates, in cross section, a further embodiment of the integrated Graetz circuit according to the present invention. This embodiment provides a completely planar arrangement, that is, all the pn-junctions terminate at one side or surface of the starting semiconductor body.

This planar semiconductor arrangement is fabricated as follows: two n-conductive zones 2 and 3 are diffused into one surface of the p-conductive semiconductor body 1. These zones 2 and 3 are separated from each other and surrounded by n-conductive isolating zones 4 and 5. The zones 4 and 5 may, for example, be diffused into the semiconductor body 1 at the same time as the zones 2 and 3 so that they form a ring around, at a depth equal to, the zones 2 and 3. A p-conductive zone 17 and 18 is diffused into each n-conductive zone 2 and 3; an n-conductive zone 19 and 21 is likewise then diffused into each p-conductive zone 17 and 18 thus producing two pnpn series of zones; namely, 1, 3, 17, 19 and 1, 2, 18, 21. The semiconductor zone 1 common to the two series of zones has a metal contact 20 connected to an electrical terminal 16. The two outer zones 18 and 21 are provided with the metal contacts 26 and 27; these contacts are connected together and to the common electrical terminal 15.

The two internal or central zones in each series of zones are connected together by common contacts 24 and 25, each of which extend over both zones. Each of these contacts is then connected with an electrical terminal 13 and 14, respectively. The metal contacts 24 and 25 are advantageously evaporated onto the semiconductor body and, for example, may consist of the lamination titanium-silver.

The portions of the surface of the semiconductor material not covered with metal contacts was coated with an insulating layer, for example, of silicon dioxide. The two outer zones 19 and 21 of the two series of zones in the arrangement of FIGURE 4 are likewise surrounded by isolating zones 22 and 23, respectively. These isolating zones are embedded in the neighboring zones 17 and 18, respectively, and possess the same conductivity type and the same depth of penetration as the other zones 19 and 21. All n-conductive zones of the semiconductor arrangement are thus surrounded by likewise n-conductive isolating zones which prevent the voltage breakdown at the curved portions of the pn-junctions or at the semiconductor surface.

The contacts of the individual zones can be made to form conductive paths which extend over the insulating layer 12 on the semiconductor surface. The two outer zones 19 and 21 can be connected together in this way by such a conductive path. As in the semiconductor arrangement of FIGURE 3 the terminals 13 and 14 of this planar arrangement form the alternating current input terminals and the terminals 15 and 16 the direct current output terminals.

Figure 5:
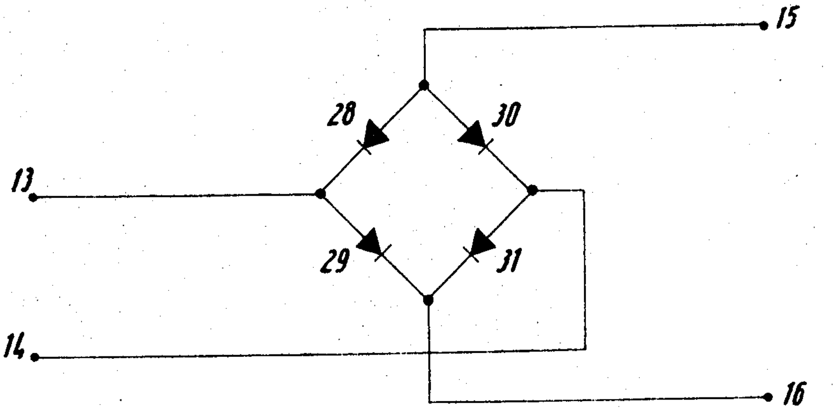
FIGURE 5 is a schematic diagram of the equivalent circuit the integrated semiconductor circuits of FIGURES 3 and 4.

FIGURE 5 shows the equivalent circuit schematic diagram of the Graetz rectifier arrangement according to the present invention. The input and output terminals are likewise labeled 13 and 14 and 15 and 16, respectively. The diodes of this Graetz circuit are formed in the integrated circuit of FIGURE 4 as follows: diode 28 by the pn-junction between the zone 19 and the zone 17; diode 29 by the pn-junction between the zones 3 and 1; diode 31 by the pn-junction between the zones 1 and 2 and the diode 30 by the pn-junction between the zones 18 and 21.

It will be understood that the above description of the present invention is susceptible to various modifications, changes, and adaptations, and the same are intended to be comprehended within the meaning and range of equivalents of the appended claims. For example, the embodiments shown and described above may both be constructed such that each semiconductor zone is doped to have the opposite conductivity type.

I claim:

1. An integrated Graetz rectifier circuit arrangement comprising, in combination:

(a) a semiconductor body of a first conductivity type;

(b) two semiconductive first zones of a second conductivity type, each disposed, electrically separated from the other, on said semiconductor body and each forming, together with said semiconductor body, a pn-junction which serves as a diode;

(c) two semiconductive second zones of said first conductivity type, each disposed on a respective one of said first zones;

(d) two semiconductive third zones of said second conductivity type, each disposed on a respective one of said second zones and each forming, together with said respective one of said second zones, a pn-junction which serves as a diode;

(e) two first electric terminal means, each connected to a respective one of said third zones and connected together;

(f) two second electric terminal means, one of said second terminal means being connected both to one of said first zones and the one of said second zones disposed thereon, and the other of said second terminal means being connected both to the other of said first zones and the other of said second zones; and (g) third electric terminal means connected to said semiconductor body of said first conductivity type.

2. The integrated circuit arrangement defined in claim 1, wherein said two first zones are embedded in the surface of said semiconductor body.

3. The integrated circuit arrangement defined in claim 2, wherein the two semiconductive bodies formed by one of said second zones and the one of said third zones disposed thereon and the other of said second zones and the other of said third zones, respectively, are mesa-shaped and wherein each of said second terminal means includes a metal layer disposed between and contacting said respective one of said first zones and said one of said second zones disposed thereon.

4. The integrated circuit arrangement defined in claim 2, wherein each one of said two second zones is embedded in the surface of a respective one of said first zones and each one of said two third zones is embedded in the surface of a respective one of said second zones, and wherein each of said two second terminal means includes an ohmic contact arranged to contact said respective one of said first zones and said one of said second zones embedded therein.

5. The integrated circuit arrangement defined in claim 2, further comprising two semiconductive first isolating zones of said second conductivity type embedded in said semiconductor body each surrounding a portion of a respective one of said first zones.

6. The integrated circuit arrangement defined in claim 5, wherein said first zones and said first isolating zones are embedded in said semiconductor body at the same depth.

7. The integrated circuit arrangement defined in claim 5, wherein said first isolating zones are ring-shaped.

8. The integrated circuit arrangement defined in claim 5, wherein said first isolating zones are shaped in the form of a rectangular frame.

9. The integrated circuit arrangement defined in claim 5, wherein the distance between each of said first zones and its respective surrounding first isolating zone is such that an inverse voltage which is less than the breakdown voltage applied across the pn-junction between said first zone and said semiconductor body will cause the space charge zone in said semiconductor body to extend out to said isolating zone.

10. The integrated circuit arrangement defined in claim 4, further comprising two semiconductive first isolating zones of said second conductivity type embedded in said semiconductor body, each surrounding a portion of a respective one of said first zones, and two semiconductive second isolating zones of said second conductivity type each embedded in a respective one of said second zones so as to surround a portion of a respective one of said third zones.

11. The integrated circuit arangement defined in claim 1, wherein said two first zones, two second zones, two third zones and the semiconductor body are all equally strongly doped.

12. The integrated circuit arrangement defined in claim 1, further comprising an insulating layer covering all exposed semiconductor surfaces of said semiconductor body and said first, second, and third semiconductive zones.

13. The integrated circuit arrangement defined in claim 12, wherein said semiconductor body is made of silicon and said insulating layer is made of a silicon oxide.

14. The integrated circuit arrangement defined in claim 3, wherein each of said metal layers is made of molybdenum.

15. The integrated circuit arrangement defined in claim 4, wherein each of said ohmic contacts is made of a lamination of titanium and silver.

16. A method of making an integrated Graetz rectifier circuit arrangement comprising the steps of:

(a) diffusing two semiconductive first zones of a second conductivity type in to the surface of a semiconductor body of a first conductivity type such that said first zones are electrically separated from each other;

(b) disposing first metal layers on the surface of each of said two first zones;

(c) disposing a semiconductor layer comprising successively a second zone of said first conductivity type and a third zone of said second conductivity type on said surface of said semiconductor body and said first metal layers, such that said second zone is positioned next to said semiconductor body and said first metal layers;

(d) disposing second metal layers, having a smaller surface area than said first metal layers, on said semiconductor layer such that each second metal layer is positioned above one of said two first metal layers; and (e) removing the material of said semiconductor layer which is not covered by said second metal layers down to the surface of said semiconductor body.

17. The method defined in claim 16 wherein said semiconductor layer is epitaxially deposited on said semiconductor body.

18. The method defined in claim 16, further comprising the step of covering the surfaces of said semiconductor body and said semiconductor layer with an oxide layer by means of thermal oxidation after said removing step has been completed.

References Cited

UNITED STATES PATENTS

| | | | |
|---|---|---|---|
| 3,199,002 | 8/1965 | Martin | 317—234 |
| 3,383,607 | 5/1968 | Avins | 329—119 |

JOHN W. HUCKERT, Primary Examiner

R. F. POLISSACK, Assistant Examiner

U.S. Cl. X.R.

29—577, 580, 589, 591; 317—235